(12) United States Patent
Juerss

(10) Patent No.: US 11,407,435 B2
(45) Date of Patent: Aug. 9, 2022

(54) ARTICULATED JOINT CONNECTION DEVICE, AND COUPLING DEVICE WITH A COUPLING BAR WITH COUPLING BAR PARTS WHICH CAN BE CONNECTED VIA AN ARTICULATED JOINT CONNECTION DEVICE

(71) Applicant: VOITH PATENT GMBH, Heidenheim (DE)

(72) Inventor: Dominik Juerss, Giesen (DE)

(73) Assignee: Voith Patent GmbH, Heidenheim (DE)

( * ) Notice: Subject to any disclaimer, the term of this patent is extended or adjusted under 35 U.S.C. 154(b) by 358 days.

(21) Appl. No.: 16/484,569

(22) PCT Filed: Jan. 29, 2018

(86) PCT No.: PCT/EP2018/052039
§ 371 (c)(1),
(2) Date: Aug. 8, 2019

(87) PCT Pub. No.: WO2018/145929
PCT Pub. Date: Aug. 16, 2018

(65) Prior Publication Data
US 2020/0094859 A1 Mar. 26, 2020

(30) Foreign Application Priority Data
Feb. 8, 2017 (DE) ...................... 10 2017 102 448.4

(51) Int. Cl.
*B61G 7/08* (2006.01)
*B61G 7/12* (2006.01)
(Continued)

(52) U.S. Cl.
CPC ................. *B61G 7/08* (2013.01); *B61G 7/12* (2013.01); *B61G 7/14* (2013.01); *B61G 9/04* (2013.01); *F16L 37/096* (2013.01); *F16L 37/127* (2013.01)

(58) Field of Classification Search
CPC ... B61G 7/08; B61G 7/12; B61G 7/14; B61G 9/04; F16L 37/096; F16L 37/127
See application file for complete search history.

(56) References Cited

U.S. PATENT DOCUMENTS 4,049,129 A 9/1977 Bergs
4,485,931 A * 12/1984 Forster ..................... B61G 3/16
213/4

(Continued)

FOREIGN PATENT DOCUMENTS

DE 2515677 A1 10/1976
DE 102014218484 A1 3/2016
(Continued)

*Primary Examiner* — Zachary L Kuhfuss
(74) *Attorney, Agent, or Firm* — Laurence A. Greenberg; Werner H. Stemer; Ralph E. Locher

(57) ABSTRACT

An articulated joint connection device force-transmits the connection of two components, each extending along a common longitudinal axis in a first working position, and for pivoting one of the two components relative to the other component about a pivot axis, which is arranged perpendicularly and parallel to the longitudinal axis, into at least one other, second working position. Furthermore, a coupling device, particularly for rail vehicles, has a coupling bar with two components which are coupled together via such an articulated joint connection device. The design configuration of the coupling elements is characterized by a drawbar sleeve joint connection.

19 Claims, 2 Drawing Sheets

(51) Int. Cl.
*B61G 7/14* (2006.01)
*B61G 9/04* (2006.01)
*F16L 37/096* (2006.01)
*F16L 37/127* (2006.01)

(56) References Cited

U.S. PATENT DOCUMENTS

| | | |
|---|---|---|
| 5,472,104 A | 12/1995 | Domsgen |
| 8,091,717 B2 | 1/2012 | Sprave et al. |
| 2008/0258431 A1 | 10/2008 | Okerlund et al. |
| 2010/0090441 A1 | 4/2010 | Stettler |

FOREIGN PATENT DOCUMENTS

| | | |
|---|---|---|
| EP | 0640519 A1 | 3/1995 |
| EP | 0808759 A1 | 11/1997 |
| EP | 1619101 A1 | 1/2006 |
| EP | 1985518 A1 | 10/2008 |
| GB | 2538253 A | 11/2016 |

\* cited by examiner

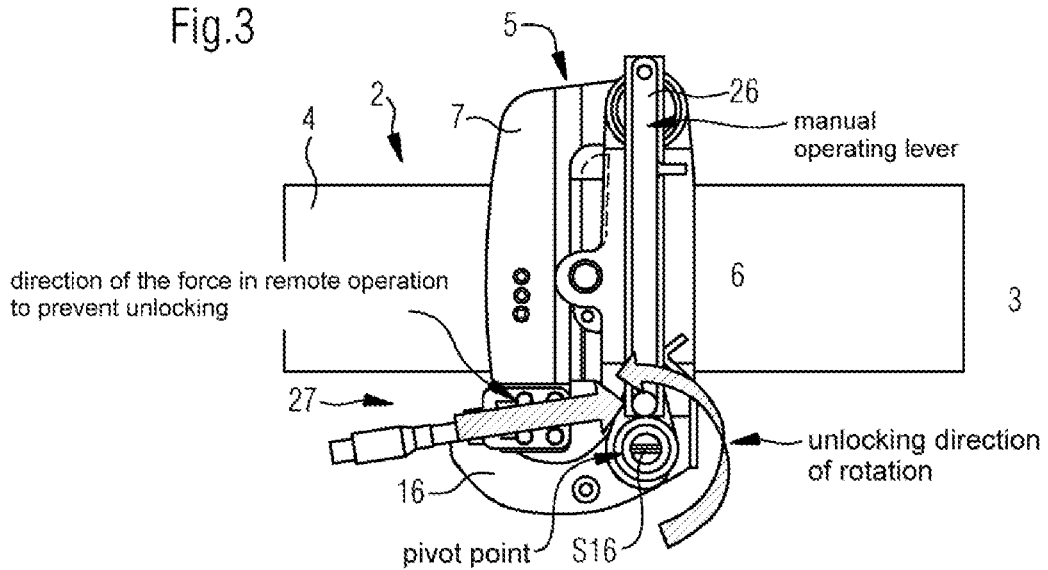
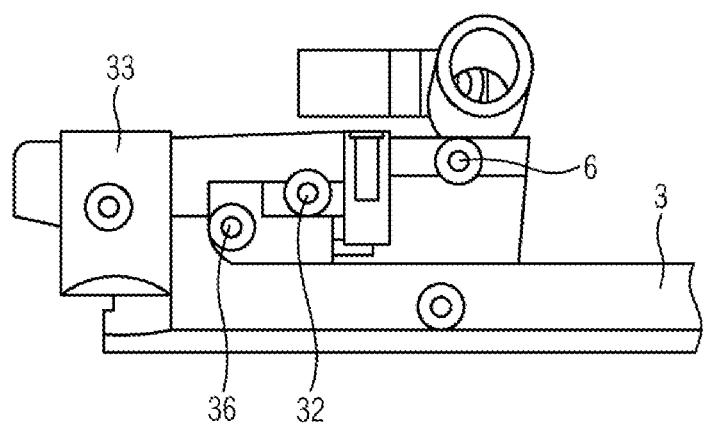
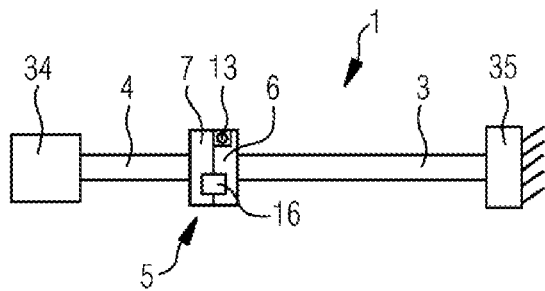
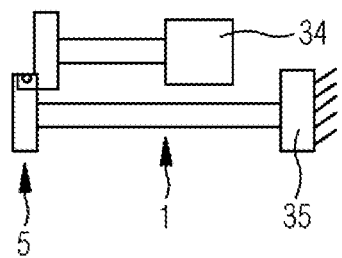

ARTICULATED JOINT CONNECTION DEVICE, AND COUPLING DEVICE WITH A COUPLING BAR WITH COUPLING BAR PARTS WHICH CAN BE CONNECTED VIA AN ARTICULATED JOINT CONNECTION DEVICE

BACKGROUND OF THE INVENTION

Field of the Invention

The invention relates to an articulated joint connection device for the force-transmitting connection of two components, each extending along a common longitudinal axis in a first working position, and for pivoting one of the two components relative to the other component about a pivot axis, which is arranged perpendicularly and parallel to the longitudinal axis, into at least one other, second working position. The invention further relates to a coupling device, in particular for rail vehicles, comprising a coupling bar with two components which are coupled together via an articulated joint connection device.

Articulated joints are already known in a wide variety of embodiments for providing articulated coupling devices for center buffer couplings or tow couplings in rail vehicles. These serve for pivoting the coupler head connected to a coupling bar part or a connector element that is not in use out of a working or operating position and into the vehicle profile. The working or operating position is characterized by the alignment of the connection between the connector element, in particular the coupler head and pivot along a longitudinal axis, and the facility for transmitting force, and when used in coupling devices describes the "coupled" state. Here, for pivoting the component, in particular the coupling bar part, coupled to the coupler head or a connector element, in and out, a pivot mechanism is generally used. In its practical implementation, a distinction is made between types of articulated joint with a central pivot axis lying in the longitudinal axis of the coupling, and systems having a pivot axis arranged laterally to the side of this. In the swiveled-in state the two components are connected together for the transmission of forces. In the swiveled-out state the swiveled-out component is preferably locked in its position relative to the other component, to which it is articulated. This position corresponds to a working position of the "uncoupled" mode. Swiveling out can be done either manually or by a control mechanism. Corresponding operating and adjusting devices are preferably provided for this purpose.

Examples of an embodiment with a central pivot axis are known from the published specifications EP 1 985 518 B1, EP 0 640 519 A1, U.S. Pat. No. 4,049,129 and EP 0 808 759 A1. The interface that can be achieved by these, with articulated connection between the individual coupling bar parts is characterized by a complicated configuration of the components in the interconnecting area specially adapted to this purpose. Where the components to be connected take the form of castings, these are characterized by a complex and singular casting geometry, which is specially matched to the particular application, and high production costs, which also entails an increased outlay in the event of repair. Integrating the articulated connection into the longitudinal axis furthermore often limits the angle of deflection and thereby the maximum attainable swivel angle. The extent of the articulated connection must also be allowed for in the total space required in the longitudinal direction of an overall system.

An embodiment in which the pivot axis is offset in relation to the longitudinal axis is known from EP 1 619 101 B1, for example. In this case the coupling elements are integrally formed with the coupling bar parts, which likewise results in a special configuration of these in the area of the articulated connection.

A disadvantage in all known embodiments in the prior art is the formation of parts relevant to the connection directly on the components, in particular coupling bar parts, to be connected together for the transmission of force in a first working position. Since these parts, besides providing the articulated connection for pivoting, must also comprise or support the devices for the force-transmitting connection of the two components, the individual components that can be connected together or pivoted in relation to one another are very complex, specially matched to the particular application and intricately formed. In addition to costly production, this also results in a low degree of standardization. This is also a problem particularly in the event of repair, since here it is possible only very rarely, if at all, to resort to standard components.

SUMMARY OF THE INVENTION

The object of the invention, therefore, is to develop an articulated joint, in particular for use in coupling devices for rail vehicles, in such a way that said disadvantages are avoided. The design and integration into a coupling device, in particular a coupling bar, is intended to lend itself to the easiest possible implementation with minimal modifications required to the components to be coupled together, in particular coupling bar parts. Where possible, the articulated joint itself should not need any special modification of attachments and interfaces to suit a specific application and use. The construction should be simple, compact and where possible modular. Furthermore, it should also be possible to easily adapt such an articulated joint connection device for other systems.

The solution according to the invention is characterized by the features of the independent claims 1. Advantageous embodiments are represented in the dependent claims.

According to the invention an articulated joint connection device is proposed for the force-transmitting connection of two components, each extending along a common longitudinal axis in a first working position, and for pivoting one of the two components relative to the other component about a pivot axis, which is arranged perpendicularly and preferably at a distance parallel to the longitudinal axis, into at least one other, second working position. This device is characterized in that it comprises two coupling elements, wherein each of the coupling elements comprises a connection area with a connector device for releasable connection to an end area of one of the components, the two coupling elements are connected together via at least one articulated connection describing the pivot axis and at least one releasable device is assigned to the two coupling elements for the force-transmitting connection of the coupling elements.

The solution according to the invention thereby provides an articulated joint connection device which dispenses with the integral formation of coupling elements on the individual components to be connected together, in particular coupling bar parts in the preferred use in coupling devices in rail vehicles, and instead relies on a formation of the coupling elements as separate components, connecting these via an articulated connection, and the scope for providing a force-transmitting connection. The articulated joint connection according to the invention at the same time also fulfils the various requirements placed on it by the facility for achieving different "coupled" and "uncoupled" working positions. These include, firstly, the transmission of forces between the components in the "coupled" working position and the compact positioning by swiveling one of the components away relative to the other when "uncoupling".

The coupling elements themselves may be of relatively simple design and depending on the chosen form of the connector device on these can be integrated into widely varying systems having the same connection geometry and similar requirement profile. The articulated joint connection device can furthermore be prefabricated and the individual components for this kept in stock. It is possible to dispense with a complex formation of the components to be connected together and the design considerations for these. Instead, there is scope here for providing standardized connector and connection devices on the coupling elements, which are easily and simply brought into connection with components having matching standard connector devices. Furthermore, the construction of the articulated joint connection device according to the invention also affords considerable advantages with regard to servicing and repair. Thus, in the event of damage to this or one of the connection components, in particular coupling bar parts, it is simply possible to replace only the functional components affected.

The connection area of an individual coupling element carrying the connector device for releasable connection to the end area of one of the components preferably comprises means for producing at least a positively interlocking connection or non-positive connection or a combination of these through interaction with connector devices arranged in the end area of the component. According to a particularly advantageous development, the connection area of an individual coupling element carrying the connector device for releasable connection to the end area of one of the components is designed as a drawbar sleeve joint for connection to a drawbar sleeve joint collar arranged in the end area of the component. This solution affords the advantage of being able to resort to standardized connection geometries for drawbar sleeve joint connections on the components to be connected together, in particular coupling elements and above all the component to be connected to this, and at the same time a very compact construction, particularly in the fitted position in a longitudinal direction. Furthermore, this also makes it feasible to provide standardized connection geometries for various installation situations. Assembly and replacement are moreover very easily accomplished.

With regard to the actual design configuration of the drawbar sleeve joint connection, there are multiple possibilities in terms of the chosen geometry and dimensioning of the various working surfaces. This also depends, in particular, on the sphere of application and the installation situation. In an advantageous form of this embodiment, as may be used, in particular, for the connection of coupling bar parts, the connector device of an individual coupling element comprises means on the inner circumference for at least indirect support in a longitudinal direction of the component, viewed on a first surface area of the drawbar sleeve joint collar, and an internally threaded area for interaction with a threaded ring for at least indirectly fastening the coupling element to the drawbar sleeve joint collar arranged in the end area of the component, in particular a second surface area on the drawbar sleeve joint collar oriented in the opposite direction to the first surface area. The term "at least indirect" in this context means that the bearing contact or fastening is achieved either directly between the two said components, or with the intermediate insertion of other components. This can be done, for example, through the provision of a supporting ring, preferably divided circumferentially into two parts for ease of assembly, between the drawbar sleeve joint collar and the threaded ring.

There are many possibilities with regard to the design of the device for releasably connecting the coupling elements together in the first ("coupled") working position there are many possibilities. This is preferably designed as a connection device selected from the following group of connection devices:

positively interlocking connection device
non-positive connection device,
in particular a clamped connection device or a fastening device or a threaded connection device.

According to a particularly advantageous embodiment the device for releasably connecting the coupling elements together in the first ("coupled") working position is designed as a locking device with a locking element and an adjusting device assigned to the locking element for operation of the locking element. This can be designed on a positively interlocking or non-positive principle. Depending on the design configuration of the locking device, in particular the adjusting device, the locking or unlocking may each be performed either automatically or manually or actively controlled, for example via corresponding adjusting devices.

According to a first embodiment the adjusting device is designed and arranged in such a way that it comprises an operating device, which is operated both for locking and unlocking purposes. The operating device in this case is at least indirectly, and preferably directly, coupled to the locking element. Operation may be performed manually or via a controllable adjusting device acting on the operating device.

According to a second particularly advantageous embodiment the adjusting device is designed and arranged in such a way that it comprises an operating device which has to be actively operated for locking or unlocking purposes. In this case the locking element is pivotally or displaceably supported under pre-tension on one of the coupling elements. The adjusting device comprises an operating element, which is designed and arranged to be actively operated or activated only for the purposes of locking or unlocking. The operating element is more preferably designed and arranged to require active operation only for the purposes of unlocking. This solution serves to ensure that without applying additional, external force the locking element will always seek the locking position, thereby investing it with its primary function of maintaining the force-transmitting connection.

An especially simple implementation of this function is afforded by an embodiment of the locking element as a curved lever element, which is supported by a first end area on one of the coupling elements so that it can pivot about a pivot axis, which is arranged perpendicularly and parallel to the longitudinal axis, and which at the other, free end area comprises at least one locking surface area for interacting with a surface area on the other of the coupling elements, forming a non-positive and/or positively interlocking connection. In order to be able to easily connect the swiveled-out component to the other component, the latter, as it swivels in, guides the locking element out of the position maintained by pre-tensioning and thereby when swiveling in assumes the function of an operating element. The locking element for this purpose preferably has an engaging or impinging surface on the free end area for interacting with the other of the coupling elements, so that in swiveling the other coupling element out of the second into the first working position it is deflected by the latter and due to the restoring forces of a pre-tensioning device provided for pre-tensioned support is automatically brought into the locking position.

The articulated joint connection device according to the invention is characterized by connector devices on the coupling elements for connection to the individual, components to be connected together for the transmission of force in the first working position, by the pivotal connection between the coupling elements, and by the device for force-transmitting connection connection. These devices are arranged and supported on the coupling elements, wherein these devices in a first variant are assigned to different coupling elements and in a second, preferred variant primarily to one of the coupling elements.

Thus, according to this second variant the releasable device for the force-transmitting connection of the coupling elements, and the articulated connection are arranged or provided on both sides of one of the two coupling elements in relation to the longitudinal axis of the articulated joint connection device.

The individual coupling element itself is preferably designed as an annular component, with flange areas arranged on the outer circumference on both sides of the longitudinal axis for arranging the articulated connection and the device for the force-transmitting connection. This affords the advantage of concentrating functions on one of the coupling elements and the simplest possible design of the other coupling element.

There are various feasible possibilities with regard to the arrangement of the individual functional devices in the longitudinal direction of the articulated joint connection device, variants with a small offset relative to one another preferably being selected, in order to provide the coupling elements and the overall articulated joint connection as a compact unit taking up as little overall space as possible. For this purpose, the releasable device for the force-transmitting connection of the coupling elements, viewed in the longitudinal direction of the articulated joint connection device, is preferably arranged in the area of extent of the connector device, arranged on an individual coupling element, for releasable connection to an end area of one of the components or inside the area of extent of both coupling elements in a longitudinal direction.

In an especially advantageous development of this embodiment the articulated connection and the releasable device for the force-transmitting connection of the coupling elements are arranged with no offset in relation to one another, viewed in the longitudinal direction of the articulated joint connection device. The arrangement is thereby concentrated on one coupling element.

In a further advantageous development the articulated connection, viewed in the longitudinal direction of the articulated joint connection device, is also arranged in the area of extent of the connector device, arranged on an individual coupling element, for releasable connection to an end area of one of the components or inside the area of extent of both coupling elements in a longitudinal direction.

Use of the articulated joint connection device according to the invention is feasible in a multiplicity of applications. A particularly advantageous application, however, is the use for the force-transmitting connection between two components of a coupling device, in particular for use in rail vehicles, wherein one of the components is to be capable of pivoting relative to the other from its position into a further second working position without the capacity for transmitting force. To do this in the prior art required specially designed components and very complex articulated joint connection designs. Some of these solutions took up a lot of overall space and were expensive to implement. With the articulated joint connection device according to the invention a compact design of optimized overall dimensions and standardized in terms of the required connection conditions can now be provided, which can be used, in particular, for the connection of two components having the aforementioned requirement profile in order to obtain two working positions in coupling devices. Such a coupling device is formed with a coupling bar extending along a longitudinal axis and having a first end area for at least indirect connection to a vehicle, a second end area for at least indirect connection to a connector element for at least indirect coupling to a further vehicle and having two components connectable via the articulated joint connection device and extending in a working position along the longitudinal axis referred to as the operating position, wherein the articulated joint connection device is designed to connect the two components together for the transmission of force in the operating position, and to move the second component out of the operating position by pivoting about a pivot axis running perpendicularly and parallel to the longitudinal axis.

It is particularly advantageous here to use the articulated joint connection device between two components, wherein a single component of the components to be connected together for transmitting force in a first working position is formed by an element selected from the following group of elements:

a coupling bar part a traction and/or buffer gear the connector element, in particular coupler head.

The solution according to the invention is explained below, referring to figures, which in detail represent the following:

BRIEF DESCRIPTION OF THE SEVERAL VIEWS OF THE DRAWING

FIG. 1b shows a top view of an embodiment according to FIG. 1a;

FIG. 3 on the basis of a view according to FIG. 1b shows a schematically simplified representation of the operating principle of an adjusting device;

FIG. 4 shows a sectional representation of the connection device between the first coupling element of the articulated joint connection device and a coupling bar part;

FIG. 5a in a schematically simplified representation illustrate the use of and 5b an articulated joint connection device in a coupling bar of a coupling device in two working positions of the articulated joint connection device.

DESCRIPTION OF THE INVENTION

Figure 1A:
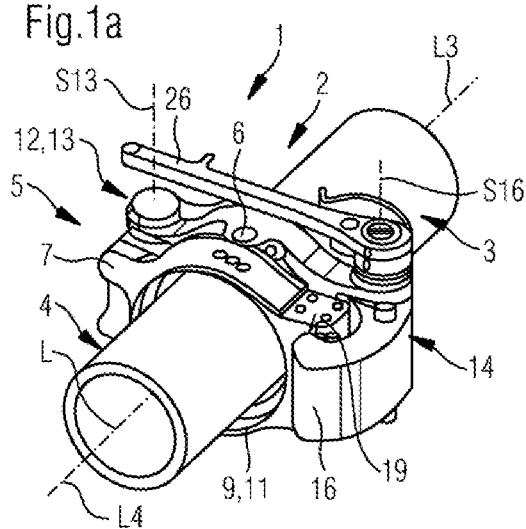
FIG. 1a in a perspective view of a detail of the coupling device shows an articulated joint connection device designed according to the invention.
Figure 1B:
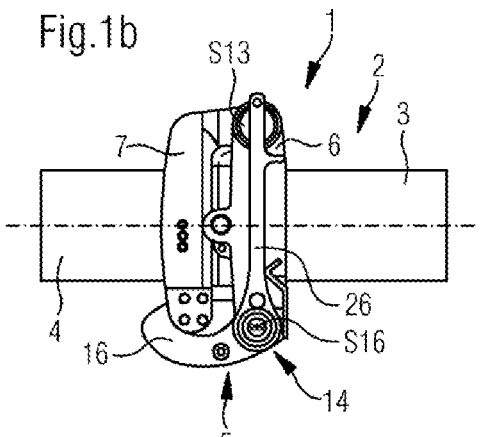

FIGS. 1a and 1b illustrate the basic construction and the basic function of an articulated joint connection device 5 designed according to the invention from the example of the connection of two components in the form of coupling bar parts 3, 4 in the "coupled" working position.

FIG. 1*a* here shows a perspective view of a detail of a coupling device 1, comprising an at least two-part coupling bar 2, which comprises—not shown here—a first end area for the articulated connection, coupling to a vehicle and a second end area for at least indirect coupling to a coupler head or another connector element for coupling to a further, second vehicle, preferably a rail vehicle. FIG. 1*b* shows a top view of the embodiment according to FIG. 1*a*. A system of coordinates is applied to illustrate the various directions by way of example. In the operating position the coupling bar 2 is characterized by an extent in the longitudinal direction along a longitudinal axis L. When used in coupling devices 1 in rail vehicles this corresponds to the extension of the longitudinal axis L3 of the coupling bar part 3 at least indirectly connected to the rail vehicle. The longitudinal axis L is further defined in the "coupled" working position by the coupling longitudinal axis, corresponding in the system of coordinates represented to the X-axis, and when used in vehicles coincides with the vehicle longitudinal direction. The Y-axis corresponds to the width direction, that is to say, the direction perpendicular to the X-axis in a horizontal plane. The Z-axis describes the height direction.

The coupling bar 2 is of two-part formation, comprising a first coupling bar part 3 and a second coupling bar part 4. The first coupling bar part 3 and the second coupling bar part 4 are coupled together by an articulated joint connection device 5, wherein the articulated joint connection device 5 allows at least two modes of operation with corresponding working positions, a first mode of operation with a "coupled" working position and a second "uncoupled" mode of operation. In the working position describing the first coupled mode of operation the two coupling bar parts 3 and 4 are arranged in an aligned position with one another and connected together for transmitting forces.

Figure 2A:
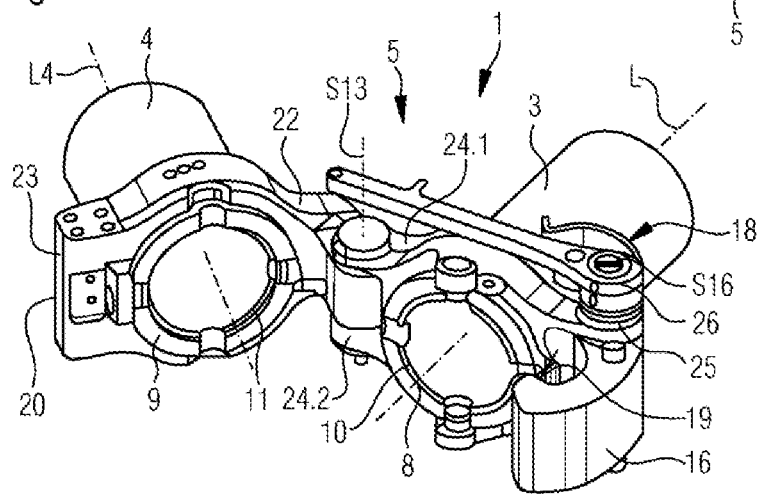
FIG. 2a on the basis of a detail of the coupling device, illustrates a perspective view of the articulated joint connection device according to the invention in the "uncoupled" position.
Figure 2B:
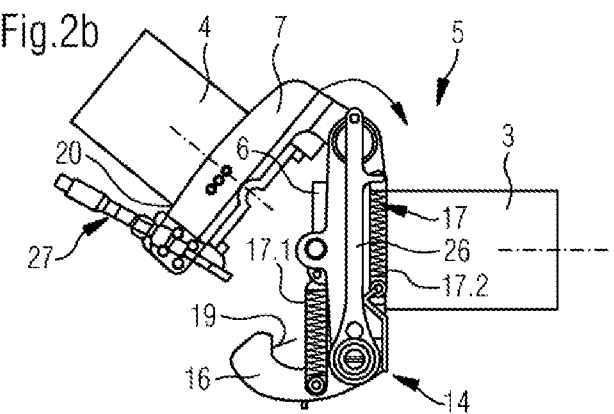
FIG. 2b illustrates an articulated joint connection device according to FIG. 2a in a top view additionally representing a pre-tensioning device.

In the second "uncoupled" mode of operation, which for the embodiment according to FIG. 1 is reproduced in different views in FIGS. 2*a* and 2*b*, the coupling bar part that can be coupled to the connector element for connection to a further vehicle, can here, by way of example 4, be swiveled away by an angle relative to the other coupling bar part 3. It goes without saying here that the functions of the coupling bar parts 3 and 4 are also interchangeable and the assignment shown for the individual components of the articulated joint connection device 5 to the coupling bar parts in FIG. 1 are also interchangeable.

FIG. 1 represents the articulated joint connection device in the "coupled" working position, that is to say the two coupling bar parts 3 and 4 are arranged coupled together coaxially with one another for the transmission of force. The longitudinal axes L3 and L4 of the coupling bar parts 3, 4 coincide with the longitudinal axis L of the coupling bar 2. Here, one of the two coupling bar parts 3 or 4 can be connected by its end area remote from the other coupling bar part at least indirectly to a first vehicle. This is not represented in detail here. The other coupling bar part serves for coupling to a connector element for coupling to another vehicle. This connection, too, is at least indirect, that is to say where necessary with the intermediate insertion of further force-transmitting elements. In the case represented, for example, the coupling bar part that can be at least indirectly connected to the vehicle is formed by the first coupling bar part 3. The coupling bar part at least indirectly connected to a connector element for coupling to a connector element of another vehicle is formed by the coupling bar part 4.

Both coupling bar parts 3, 4 are preferably formed with a cylindrical or hollow cylindrical cross section and are coupled together at the opposing end areas by an articulated joint connection device 5. In the force-transmitting mode the articulated joint connection device 5 functions in the "coupled" position for connection and the transmission of force. For this purpose the articulated joint connection device 5 comprises two coupling elements that can each be connected to the respective coupling bar parts 3, 4, a first annular coupling element 6 that can be connected to the first coupling bar part 3 and a second annular coupling element 7 that can be connected to the second coupling bar part 4. The connection to the respective coupling bar part 3, 4 is made via connector devices 8, 9, which are provided on the annular coupling element 6, 7 and which can be brought into operative connection with connector devices 10, 11 of complementary design on the respective coupling bar parts—the first coupling bar part 3 and the second coupling bar part 3. Each of the two annular coupling elements 6, 7 here is formed in in such a way that it is preferably formed fully enclosing the respective coupling bar part 3, 4 circumferentially at each of the end areas facing one another in the operating position.

The annular coupling elements 6 and 7 are articulated together in such a way as to allow pivoting in relation to one another over a predefined angular range about a pivot axis S13 running perpendicularly to the longitudinal axis L and parallel thereto. In the fitted position relative to the longitudinal axis L an articulated connection 13 is provided for this purpose, which in the simplest case is afforded by a pivot pin, the axis of rotation of which describes the pivot axis S13. The pivot axis S13 is preferably arranged in the longitudinal direction inside the extent of the two coupling elements 6, 7 in the coupled position. The pivot axis S13 is more preferably situated in a plane that can be described by the annular coupling element 6 and when this is connected to the coupling bar part 3 preferably runs laterally in relation to the outer circumference of the respective coupling bar part 3. Depending on the design and dimensioning of the individual parts, this articulated connection 13 allows pivoting beyond a dead point position between the two coupling bar parts 3 and 4.

To achieve coupling in the operating position and hence the "coupled" working position, a device 12, is furthermore provided for the force-transmitting connection of the coupling elements 6, 7 in the "coupled" working position, which is releasable. This is most advantageously designed as a locking device 14, which in the operating position couples the two coupling elements 6 and 7 together for the transmission of force and locks them in relation to one another. This locking device 14 may be formed in various ways. FIGS. 1*a* and 1*b* illustrate a particularly advantageous embodiment, in which a pivoted locking element 16, which is designed and arranged so as in the operating position to form a non-positive or positively interlocking connection with an opposing element 22 on the other coupling element 7, is provided on one of the two coupling elements 6 or 7, in the case shown on the coupling element 6. In the case represented the locking element 16 is designed to grip around the other coupling element 7 at the outer circumference. For this purpose, the locking element 16 is designed slightly curved when viewed in top view and on its end area facing the coupling bar 2 comprises correspondingly formed working surfaces, which allow such gripping.

In particular, the locking element 16 here, for example, takes the form of a lever-like curved element having a locking area, which viewed in the fitted position is rotatable about a vertical axis, in particular perpendicularly to the longitudinal axis L, and which can be pivoted with an offset in relation to this arranged pivot axis S16. The locking element 16 in the form of a locking lever here comprises a surface area 19 as locking area, which in the operating position forms a non-positive connection with a surface area 20 on the coupling element 7, in particular on flange-like extensions 23, 22 on the outer circumference of the annular coupling element 7, provided to the side of the longitudinal axis L. The surface area 20 here in the case shown is provided on the coupling element 7 on the side remote from the coupling element 6, whilst the surface area 19 describing the locking area is aligned with this in the coupled position.

The locking device 14 may be arranged and designed in such a way that locking ensues automatically when the two coupling elements 6 and 7 are arranged in the operating position, or has to be operated separately for locking purposes. In the latter case a correspondingly designed adjusting device (not represented here) is provided for active movement of the locking element 16 both into the locking position and also for unlocking and thereby uncoupling the articulated joint connection device 5. In a particularly advantageous embodiment, however, locking devices 14 are used, in which the locking element 16 locks automatically when the swiveled-out coupling bar part 4 is swiveled into the aligned position with the other coupling bar part 3, and needs to be actively operated only in order to release the connection. When swiveling from the "uncoupled" working position into the operating position and thereby into the "coupled" working position, the locking element 16 here is brought into a position in which, viewed in the longitudinal direction of the coupling device 1, the two coupling elements 6 and 7 are locked and tensioned in relation to one another. For releasing, an adjusting device 18 in provided, which allows the second coupling element to be shifted from a released position relative to the first coupling element, cancelling the locking. The adjusting device 18 for this purpose may be designed in a variety of ways. In the simplest case the adjusting device 18 comprises an operating lever 26. This is rotationally fixed to the pivot axis S16 of the locking element 16 and when pivoting in the pivoting direction indicated allows a corresponding deflection of the locking element 16.

The automatic locking when swiveling the coupling bar part in is this is advantageously achieved, however, in that the position of the locking element 16 is held pre-tensioned in relation to the coupling element 6, and when locking is desired the locking element 16 is deflected in opposition to the pre-tension by applying a force as the swiveled-out coupling bar part is swiveled in, and on reaching the required position (aligned position with the other coupling bar part) assumes the locking position owing to its design configuration and the pre-tensioning, and locks two coupling elements 6, 7 in relation to one another. In order to ensure pivoting of the coupling bar part 4 into a second working position, an adjusting device 18 is provided, which then actively pivots the locking element 16 about the pivot axis S16. The pre-tensioning device is not represented in FIGS. 1a, 1b and 2a. In an exemplary embodiment these may be provided by spring devices. These spring devices may be integrated directly into the connection between the locking element 16 and an operating lever 26 of the adjusting device 18 and locking element 16 and coupling element 6. Furthermore, it is feasible to couple the operating lever 26 rigidly to the locking element 16 and to support the operating lever 26 here, correspondingly pre-tensioned via the coupling element 7. In FIG. 2b the embodiment of a pre-tensioning device 17 is reproduced by way of example in a top view to explain the embodiment according to FIG. 1. The locking element 16 is preferably held pre-tensioned in the locking position by an accumulator unit, particularly in the form of spring elements 17.1, 17.2, wherein a first spring element 17.1 is provided between the coupling element 6 and the locking element 16 and a second between the operating lever 26 and the locking element.

In all embodiments a locking device 14 and articulated connection 13 are advantageously assigned to one of the two coupling elements 6 or 7 or supported on one of the two coupling elements 6, 7. As represented in FIGS. 1, and 2 this is the coupling element 6. It is also feasible, however, to arrange the locking device 14 and articulated connection 13 on the other coupling element 7 or to assign each of these to different coupling elements 6 and 7.

It is particularly advantageous if the locking device 14 and the articulated connection 13 are arranged on both sides of the longitudinal axis L and preferably with no offset in relation to one another in the longitudinal direction.

The embodiment represented in FIGS. 1 and 2 is especially space-saving and compact. In this embodiment the individual annular coupling element 6 or 7 is formed in such a way that, viewed in the fitted position, it comprises flange areas formed in the width direction of the coupling device 1 on either side of the coupling bar 2, which on the one side of the coupling bar 3 serves to provide the articulated connection 13 and arrangement and on the other side of the locking device 14.

For a better understanding, reference is made, in particular, to the representation of the articulated joint connection device 5 in the swiveled-out position of the coupling bar parts 3, 4 in FIGS. 2a and 2b. These show the connector devices 8 and 9, which are arranged on the inner circumference of the annular coupling elements 6 and 7 and which can be brought into operative connection with the matching connector devices 10 and 11 arranged on the respective coupling bars 3 and 4. It is furthermore possible to see the embodiment as an element circumferentially enclosing the coupling bar part 3 and 4 with lateral flange-like areas carrying working surfaces. Viewed in the fitted position, these are arranged on both sides of the longitudinal axis and preferably oriented running either in a circumferential direction around the coupling bar, or laterally. The two flange areas are denoted by 22 and 23 on the second annular coupling element 7, and 24 and 25 on the first coupling element 6. The flange areas 22 and 24 here serve to provide the articulated connection 13. For this purpose, the flange area 24 comprises two flange area portions 24.1 and 24.2, which are formed extending perpendicularly to the longitudinal axis in a horizontal direction and are arranged separated by a distance from one another in a vertical direction. Extending though these is a passage for receiving a pivot pin or some other form of swivel joint. The flange area 22 is designed with a projection oriented at an angle, which serves to provide a hinged connection to the two flange area portions 24.1 and 24.2. The design configuration of the locking device 14 can also be seen, in particular the locking element 16 in the form of a locking lever, which is designed in such a way as to grip around the flange area 23. In the fitted position the operating lever 26 of the adjusting device 18 is arranged above of the annular element. The two pivot axes, the pivot axis S13 for providing the articulated connection 13, and S16 for providing the articulated connection between the locking element 16 and the annular coupling element 6 are preferably arranged parallel to one another. In a particularly advantageous embodiment, the annular coupling element 6 is designed in such a way that the pivot axes S13, S16 are arranged symmetrically about the longitudinal axis L.

In FIG. 3 the facility for remote actuation is depicted taking the embodiment in FIG. 2b as an example. Here an adjusting device 27 is provided, which acts on the operating lever 26 of the locking device 14. This adjusting device 27 is preferably supported on a connector element on the coupling bar 2. In the simplest case the articulated joint connection device 5 is integrated into the coupling bar 2 in such a way that the coupling bar part, which is coupled to the coupler head, is free of the support of the locking device 14 and the remote actuation can therefore be supported on the coupler head.

FIG. 4 in a schematically simplified representation shows the possibility of mechanical connection between the coupling element 6 and the coupling part 3. Here the end area of the coupling bar part 3 facing the other coupling bar part 4 in the fitted position comprises annularly circumferential flange area, in particular drawbar sleeve joint collar. Also visible is the coupling element 6 and its design configuration on the inner circumference, together with the positional fixing between the two via a supporting ring 30 and the fastening via a threaded ring 32 that can be non-positively connected to the supporting ring and screw-fastened to the coupling element. Locking in an axial direction is in each case provided by a securing pin 33. In order to secure the assembly, the coupling element 6 here is pushed over the end area of the coupling part 3 and secured with securing pins 33. The supporting ring 30 is inserted and the threaded ring 32, which serves for clamping between the supporting ring 30 and coupling element 6 on the one hand and the supporting ring 30 and component 3 on the other, is screwed in.

In a particularly advantageous embodiment and for securing the connection, the supporting ring 30 is divided circumferentially into two parts and has two different diametral areas in the fitted position, which serve to provide the various functions and support functions.

FIGS. 5a and 5b in a schematically simplified representation show the use of an articulated joint connection device 5 in a coupling device 1 in the "coupled" working position in FIG. 5a and "uncoupled" in FIG. 5b. The articulated joint connection device 5 is arranged between two coupling bar parts 3, 4. The coupling bar part 4 here serves for coupling to a connector element in the form of a coupler head 34. The coupling bar part 3 here serves for coupling to a pivot 35 on the vehicle.

LIST OF REFERENCE NUMERALS 1 coupling device
2 coupling bar
3 first coupling bar part
4 second coupling bar part
5 articulated joint connection
6 annular coupling element
7 annular coupling element
8 connector device
9 connector device
10 connector device
11 connector device
12 device for the articulated connection
13 articulated connection
14 locking device
16 locking element
17 pre-tensioning device
17.1, 17.2 spring elements
18 adjusting device
19 surface
20 flange
22 flange area
23 flange area
24.1, 24.2 flange area
25 flange area
26 operating lever
27 adjusting device
30 supporting ring
32 threaded ring
33 pin
34 coupler head
35 pivot
L longitudinal axis
L3, L4 longitudinal axis
S13 pivot axis
S16 pivot axis

The invention claimed is:

1. An articulated joint connection device for a force-transmitting connection of two components, each extending along a common longitudinal axis in a first coupled working position, and for pivoting one of the two components relative to the other component about a pivot axis into at least one other, second uncoupled working position, the pivot axis being disposed perpendicularly to the common longitudinal axis, the articulated joint connection device comprising:
    two coupling elements each having a connection area with a connector device for releasable connection to an end area of one of the two components;
    at least one articulated connection, said two coupling elements being connected together via said at least one articulated connection defining the pivot axis; and
    at least one releasable device assigned to said two coupling elements for the force-transmitting connection of said coupling elements, said at least one releasable device formed by a locking element pivotably attached to the one of said two coupling elements, said locking element being pivotable into a locking position in which said locking element grips around the other one of said two coupling elements.

2. The articulated joint connection device according to claim 1, wherein said connection area of an individual one of said coupling elements carrying said connector device for releasable connection to the end area of one of the two components contains means for producing at least a force-locking connection, a form-locking connection, or a combination of the form-locking connection and the force-locking connection through interaction with a further connector device disposed in the end area of the one component.

3. The articulated joint connection device according to claim 1, wherein said connection area of an individual one of said coupling elements carrying said connector device for releasable connection to the end area of one of the components is configured as a one-piece drawbar sleeve joint for connection to a drawbar sleeve joint collars disposed in the end area of the one component.

4. The articulated joint connection device according to claim 3,
    further comprising a threaded ring; and
    wherein said connector device of said individual coupling element has means disposed on an inner circumference for at least indirect support in the a longitudinal direction of a component, viewed on a first surface area of the drawbar sleeve joint collar, and an internally threaded area for interaction with said threaded ring for at least indirectly fastening said coupling element to the drawbar sleeve joint collar disposed in the end area of the component.

5. The articulated joint connection device according to claim 1, wherein said releasable device for releasably connecting said coupling elements together in the first coupled working position is configured as a connection device selected from the group consisting of:
force-locking connection devices;
form-locking connection devices;
clamped connection devices;
fastening devices; and
threaded connection devices.

6. The articulated joint connection device according to claim 1, wherein said releasable device for releasably connecting said coupling elements together in the first coupled working position is configured as a locking device with a locking element and an adjusting device assigned to said locking element for operation of said locking element.

7. The articulated joint connection device according to claim 6, wherein:
said locking element is pivotally or displaceably supported under pre-tension on one of said coupling elements; and
said adjusting device has an operating element, which is configured and disposed to be actively operated or activated only for purposes of locking or unlocking.

8. The articulated joint connection device according to claim 7,
further comprising a pre-tensioning device; and
wherein said locking element has an engaging or impinging surface on a free end area for interacting with the other one of said coupling elements, so that when swiveling the other one of said coupling elements out of the second uncoupled working position into the first coupled working position, said locking element is deflected by the other one of said coupling elements and due to restoring forces of said pre-tensioning device provided for pre-tensioned support is automatically brought into a locking position.

9. The articulated joint connection device according to claim 6, wherein said locking element is configured as a curved lever element, which is supported by a first end area on one of said coupling elements so that said locking element can pivot about a further pivot axis, which is disposed perpendicularly to the common longitudinal axis, and said locking element has at a second free end area at least one locking surface area for interacting with a surface area on the other one of said coupling elements, forming a form-locking connection or a force locking connection.

10. The articulated joint connection device according to claim 1, wherein said releasable device for the force-transmitting connection of said coupling elements and said articulated connection are disposed or provided on both sides of one of said two coupling elements in relation to the common longitudinal axis of the articulated joint connection device.

11. The articulated joint connection device according to claim 1, wherein each one of said coupling elements is configured as an annular component, with flange areas disposed on an outer circumference on both sides of the common longitudinal axis.

12. The articulated joint connection device according to claim 1, wherein said at least one releasable device is attached to an end of the one of said two coupling elements.

13. The articulated joint connection device according to claim 1, wherein said articulated connection and said releasable device for the force-transmitting connection of said coupling elements are disposed with no offset in relation to one another, viewed in the common longitudinal direction of the articulated joint connection device.

14. The articulated joint connection device according to claim 1, wherein said articulated connection, viewed in the common longitudinal direction of the articulated joint connection device, is, disposed on an individual one of said coupling elements, for releasable connection to the end area of one of the components.

15. The articulated joint connection device according to claim 1, wherein the pivot axis is disposed at a distance from the common longitudinal axis.

16. A coupling device, comprising:
an articulated joint connection device according to claim 1;
a connector element; and
a coupling bar extending along the common longitudinal axis having a first end area for at least indirect connection to a vehicle, a second end area for at least indirect connection to said connector element for at least indirect coupling to a further rail vehicle and having first and second components connectable via said articulated joint connection device and extending in a working position along the common longitudinal axis referred to as an operating position, wherein said articulated joint connection device is configured to connect said first and second components together for the transmission of force in the operating position, and to move said second component out of the operating position by pivoting about said pivot axis running perpendicularly or parallel to the common longitudinal axis.

17. The coupling device according to claim 16, wherein one of said first and second components to be connected together for transmitting force in the first coupled working position is formed by an element selected from the group consisting of:
said coupling bar part;
said coupling bar;
a traction and/or buffer gear;
a connector element; and
a coupler head.

18. A coupling device, comprising:
a coupler head;
a coupling bar extending along a longitudinal axis, having a first end area for at least indirect connection to a vehicle and a second end area for at least in indirect connection to said coupler head for coupling to a counter-coupling head of a second vehicle; and
an articulated joint connection device according to claim 1 and disposed between said coupler head and said coupling bar, or said coupling bar and a pivoted connection to the rail vehicle or said coupling bar parts of said coupling bar.

19. The articulated joint connection device according to claim 1, wherein said locking element is pivotable about an axis, and said locking element longitudinally extends transversely to said axis.

* * * * *